(12) United States Patent
Stabeno

(10) Patent No.: US 7,427,183 B2
(45) Date of Patent: Sep. 23, 2008

(54) REVERSIBLE TRANSPORT TRAILER

(75) Inventor: Gary L. Stabeno, 717 W. Margaret Dr., Waco, TX (US) 76706

(73) Assignee: Gary L. Stabeno, Waco, TX (US)

( * ) Notice: Subject to any disclaimer, the term of this patent is extended or adjusted under 35 U.S.C. 154(b) by 83 days.

(21) Appl. No.: 11/343,767

(22) Filed: Jan. 31, 2006

(65) Prior Publication Data

US 2006/0245877 A1 Nov. 2, 2006

Related U.S. Application Data

(60) Provisional application No. 60/654,429, filed on Feb. 18, 2005.

(51) Int. Cl.
*B60P 1/04* (2006.01)
*B60P 3/06* (2006.01)

(52) U.S. Cl. ...................................... 414/482; 414/483

(58) Field of Classification Search ................. 414/482, 414/483
See application file for complete search history.

(56) References Cited

U.S. PATENT DOCUMENTS

| | | | | |
|---|---|---|---|---|
| 1,449,767 A | * | 3/1923 | MacLean ..................... 104/44 |
| 2,572,776 A | * | 10/1951 | Smith .......................... 404/108 |
| 2,786,590 A | * | 3/1957 | Edwards et al. ............. 414/477 |
| 3,419,282 A | * | 12/1968 | Toews .......................... 280/63 |
| 3,536,214 A | * | 10/1970 | Sorg et al. ................... 414/537 |
| 3,604,579 A | * | 9/1971 | Jenkins ....................... 414/482 |
| 3,720,336 A | * | 3/1973 | Murray et al. ............... 414/470 |
| 3,757,972 A | * | 9/1973 | Martin ........................ 414/537 |
| 3,945,521 A | * | 3/1976 | Decker ........................ 414/483 |
| 4,109,809 A | * | 8/1978 | Clark .......................... 414/480 |
| 4,309,708 A | * | 1/1982 | Sayovitz ...................... 343/713 |
| 4,796,029 A | * | 1/1989 | Duppong et al. ............. 342/13 |
| 4,796,537 A | * | 1/1989 | Besser ......................... 104/37 |
| 4,833,484 A | * | 5/1989 | Garrood et al. ........ 343/781 CA |
| 5,259,720 A | * | 11/1993 | Lobner ........................ 414/483 |
| 5,540,538 A | * | 7/1996 | Head, Sr. ..................... 414/485 |
| 5,622,299 A | * | 4/1997 | Berard ........................ 224/403 |
| 5,816,765 A | * | 10/1998 | Pijanowski .................. 414/477 |
| 5,879,123 A | * | 3/1999 | Blaikie ........................ 414/537 |
| 6,086,082 A | * | 7/2000 | Andol ......................... 280/414.1 |
| 6,253,976 B1 | * | 7/2001 | Coleman et al. ............ 224/404 |
| 2004/0134674 A1 | * | 7/2004 | Skorez ........................ 173/192 |

* cited by examiner

*Primary Examiner*—James Keenan
(74) *Attorney, Agent, or Firm*—Michael A. O'Neil

(57) ABSTRACT

A transport trailer comprises a support surface mounted for rotation relative to an underlying frame to facilitate the loading of vehicles and other articles by forward movement thereof and the unloading of the vehicles and other articles also by forward movement thereof.

2 Claims, 11 Drawing Sheets

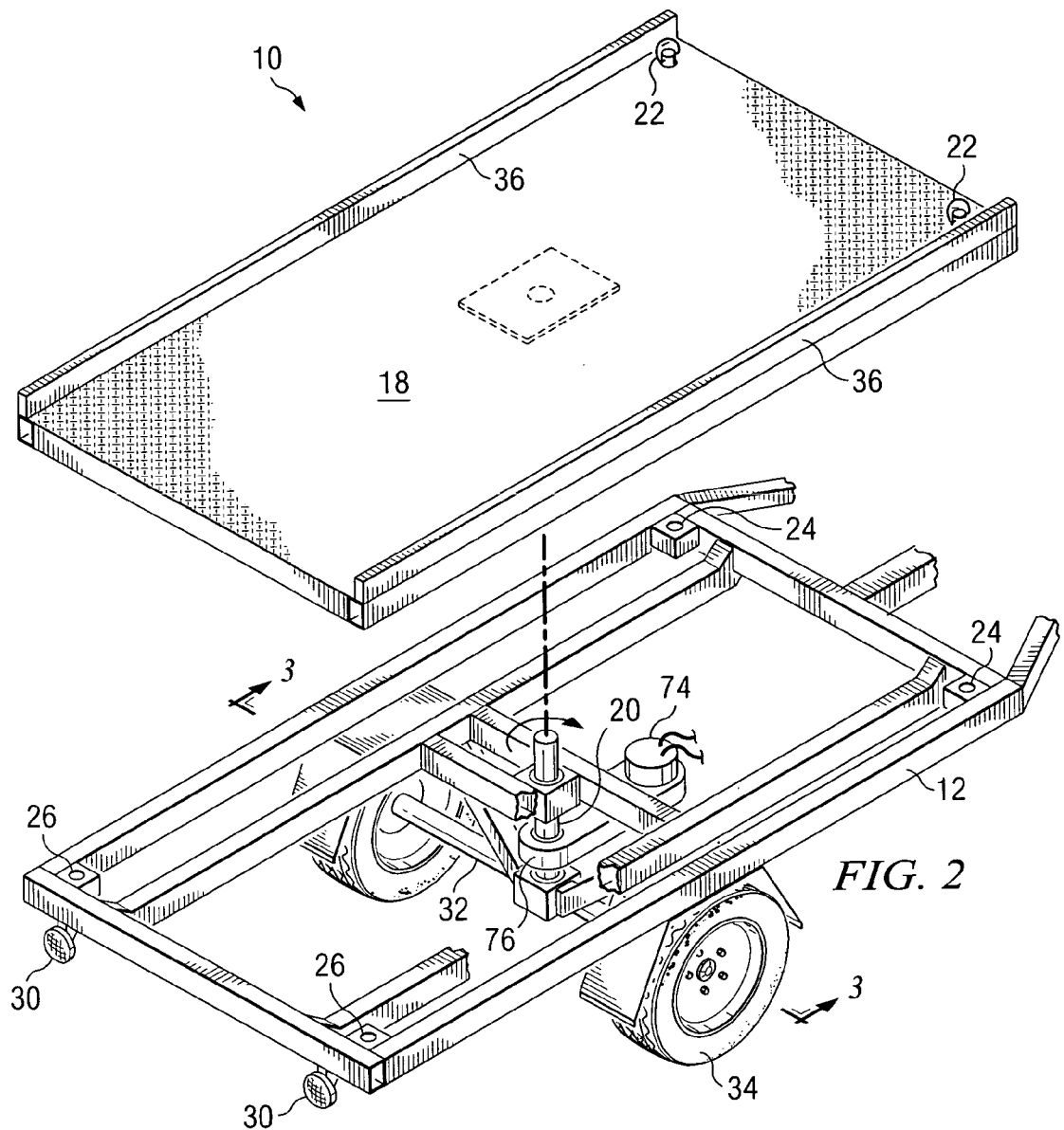
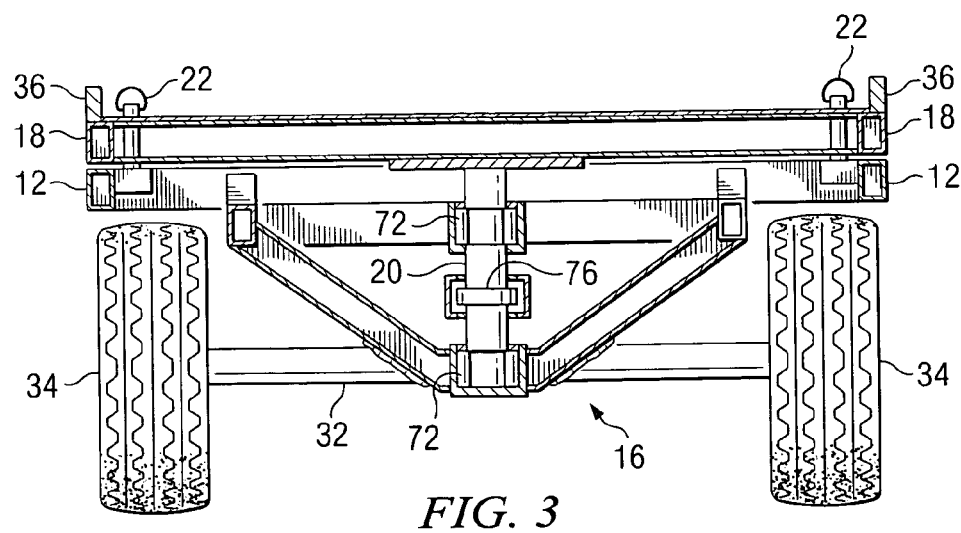
FIG. 2
FIG. 3

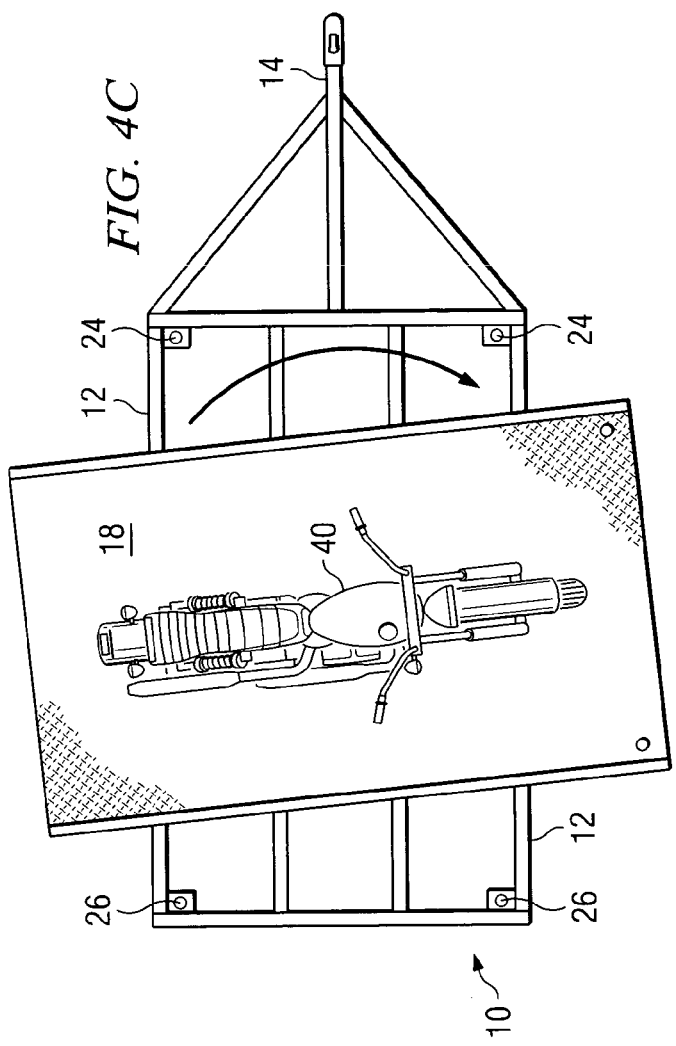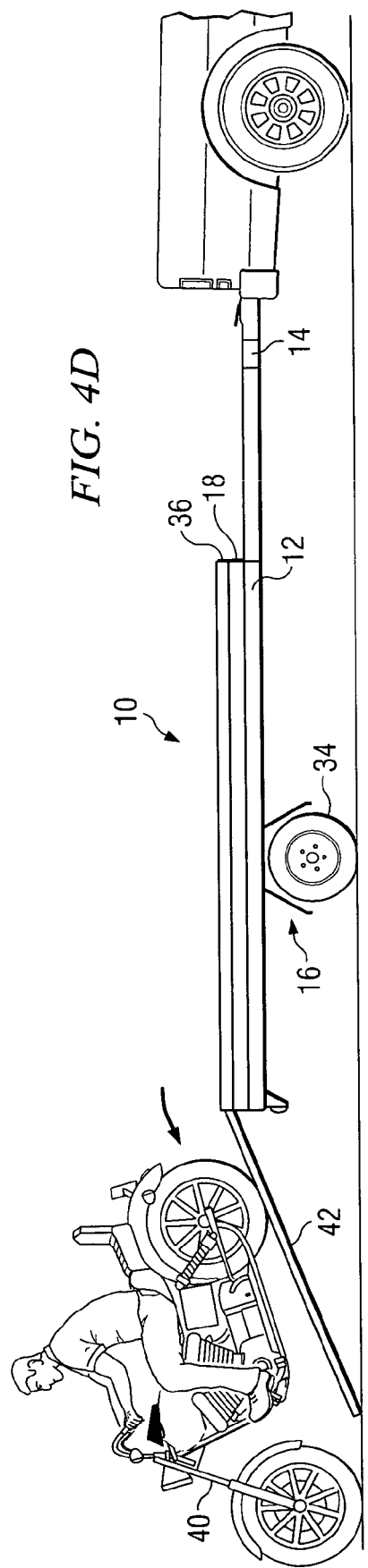

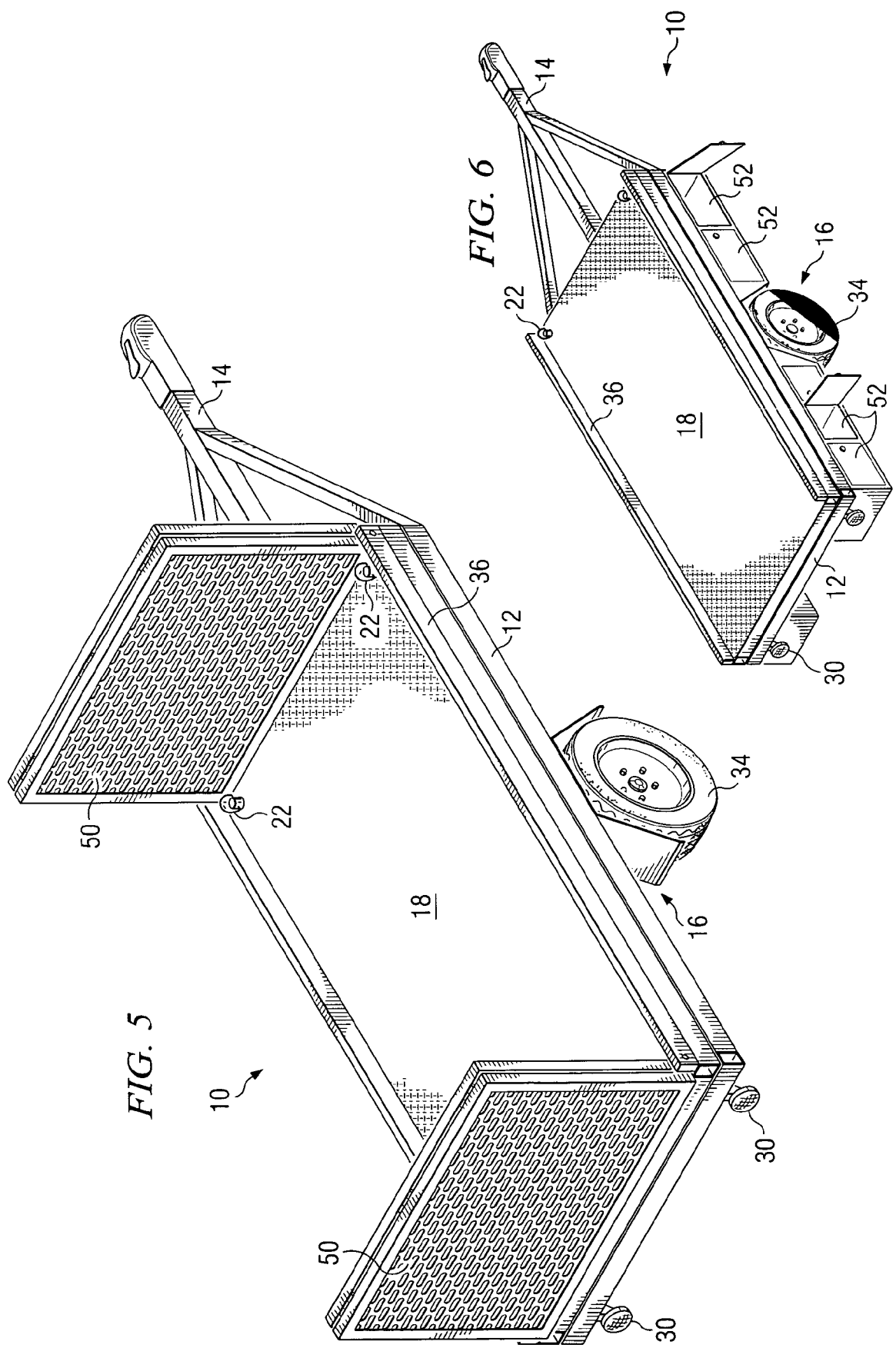

REVERSIBLE TRANSPORT TRAILER

CLAIM OF PRIORITY

Applicant claims priority based on provisional patent application Ser. No. 60/654,429 filed Feb. 18, 2005, the entire contents of which are incorporated herein by reference.

TECHNICAL FIELD

This invention relates generally to transport trailers, and more particularly to an improved transport trailer having a reversible support surface that facilitates unloading of items previously loaded and transported thereon.

BACKGROUND AND SUMMARY OF THE INVENTION

Transport trailers have long been used to transport vehicles such as motorcycles, scooters, four wheelers, all terrain vehicles, other vehicles and other items behind cars, trucks, recreational vehicles, etc. Traditionally, a vehicle or other item is driven or positioned on the platform of the transport trailer in a forward orientation. Unloading can only be accomplished with the vehicle or other item in a backward or reverse orientation. Motorcycles in particular typically do not have a reverse gear, meaning that moving the motorcycle off of the platform requires rolling the motorcycle backwards. Wheeling a motorcycle or other vehicle backwards down an inclined surface is difficult at best. Additionally, there is a substantial risk to the person unloading the motorcycle and injury to persons nearby if problems arise during unloading. Thus, a need exists for a transport trailer having a support surface that is reversible such that motorcycles, etc., can be unloaded in a forward orientation.

The present invention comprises an improved transport trailer which overcomes the foregoing and other difficulties which have long since characterized the prior art. In accordance with the broader aspects of the invention, a transport trailer is equipped with a rotating upper support surface which facilitates unloading of motorcycles, scooters, four wheelers, all terrain vehicles, etc., and other items commonly transported on trailers in a forward orientation.

In accordance with more specific aspects of the invention, the transport trailer of the present invention is equipped with an upper support surface which rotates between a forward facing orientation and a rearward facing orientation. Items to be transported are loaded onto the trailer from the rear and are secured and transported in a forward orientation. When the items are to be unloaded, the upper support surface is rotated into its reverse orientation such that the transported item faces the rear of the trailer and can be driven off or unloaded in a forward orientation rather than in reverse.

BRIEF DESCRIPTION OF THE DRAWINGS

A more complete understanding of the present invention may be had by reference to the following Detailed Description when taken in connection with the accompanying Drawings, wherein:

FIG. 2 is an exploded perspective view of the transport trailer shown in FIG. 1;

FIG. 3 is a sectional view taken along the line 3-3 in FIG. 2 in the direction of the arrows;

FIG. 4C is an environmental view illustrating a somewhat later step in the utilization of the transport trailer shown in FIG. 1;

FIG. 4D is an environmental view illustrating a still later step in the utilization of the transport trailer shown in FIG. 1;

FIG. 5 is a perspective view illustrating the transport trailer shown in FIG. 1 comprising additional components;

FIG. 6 is a perspective view illustrating the transport trailer shown in FIG. 1 comprising alternate additional components;

DETAILED DESCRIPTION

Figure 1:
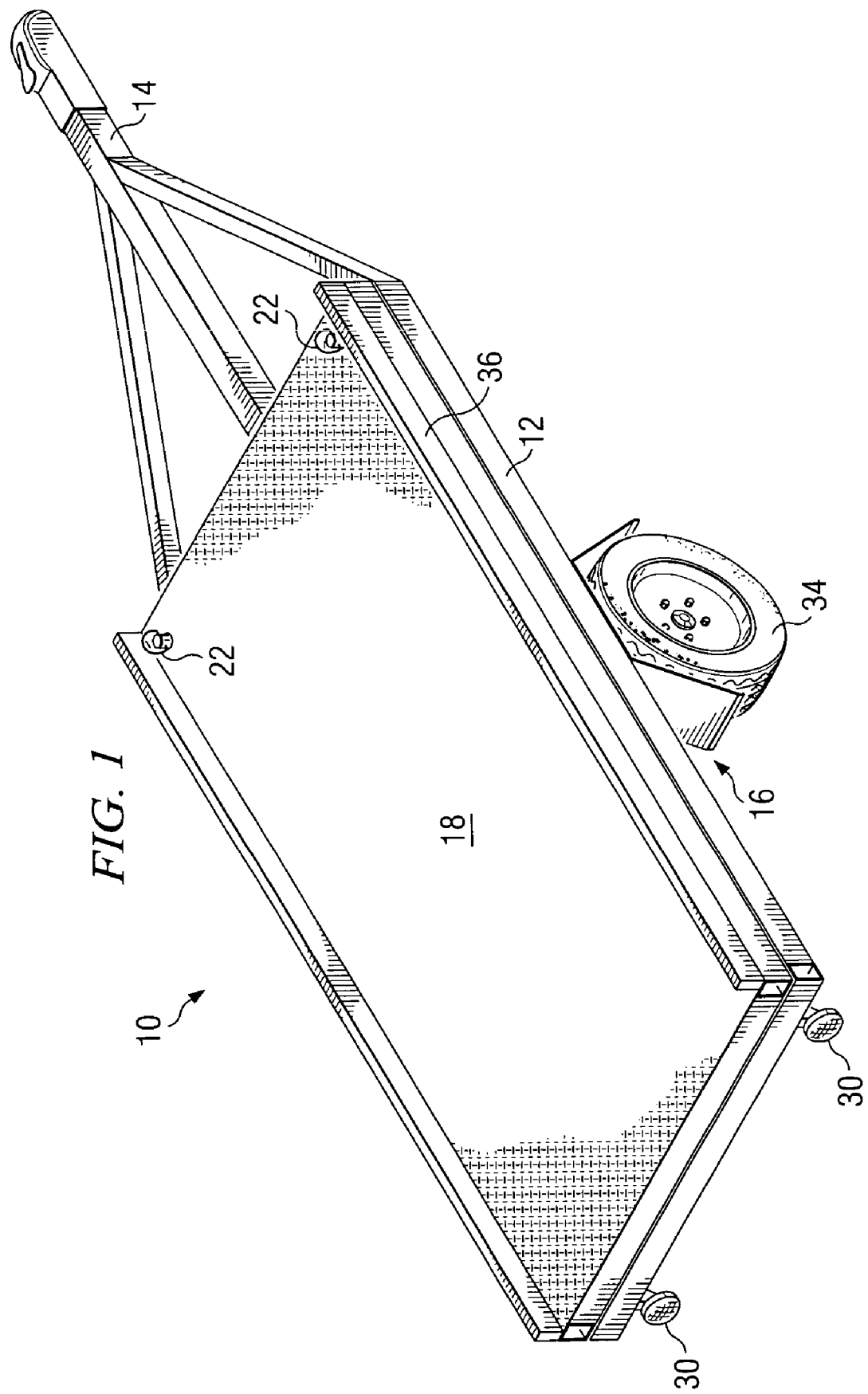
FIG. 1 is a perspective view illustrating a transport trailer comprising a first embodiment of the present invention.

Referring now to the Drawings, and particularly to FIGS. 1 and 2 thereof, there is shown a transport trailer 10 comprising a first embodiment of the invention. The trailer comprises a frame 12 having a conventional hitch assembly 14 attached to the front thereof and a conventional wheel assembly 16 mounted therebelow. Mounted directly above the frame 12 is a support surface 18. The support surface 18 is rotatably mounted on the distal end of a vertical shaft 20 which facilitates rotation of the support surface 18 relative to the frame 12 between a forward orientation and a reverse orientation.

The support surface 18 is normally locked against rotation by locking pins 22. When the support surface 18 is in its forward orientation, the locking pins 22 are secured in front apertures 24 extending into the frame 12. Alternatively, the locking pins 22 are secured in rear apertures 26 of the frame 12 when the support surface is in its reverse orientation. During transport, the support surface 18 is secured in its forward orientation. For unloading, the locking pins 22 are removed from the front apertures 24, the support surface 18 is rotated 180°, and the locking pins 22 are then inserted into the rear apertures 26.

The frame 12 is constructed of steel, wood, and/or other sturdy and durable materials known to those skilled in the art for use in the manufacture of transport trailers. Alternatively, the frame 12 may be a solid surface comprising steel, wood, and/or other sturdy and durable materials known to those skilled in the art for use in the manufacture of utility and other types of trailers. Lights 30 are mounted on the frame 12 or elsewhere for compliance with traffic regulations.

Referring particularly to FIGS. 2 and 3, the shaft 20 is fixedly secured to the support surface 18 and is rotatably supported on the frame 12 by bearings 72 mounted thereon. Depending upon the requirements of particular applications of the invention, a drive motor 74 may be employed to rotate the support surface 18 relative to the frame 12. If employed the motor 74 is actuated by electrical power supplied from the vehicle which is utilized to tow the trailer 10. The motor 74 is operatively connected to the shaft 20 by a conventional transmission 76.

The frame 12 and the components of the trailer 10 mounted thereon are supported for movement over the underlying surface by the wheel assembly 16. As is best shown in FIG. 3, the wheel assembly 16 comprises an axle 32 having wheels 34 affixed to the opposite ends thereof. The axis of the vertical shaft 20 is rearward of the axis of the axle 32 and extends through the frame 12.

The support surface 18 may comprise a solid surface comprising steel, wood, and/or other sturdy and durable materials known to those skilled in the art for use in the manufacture of transport trailers. Alternatively, the support surface 18 may comprise one or more narrow tracks adapted to receive and support the wheels of a vehicle. Side rails 36 extending the length of the support surface 18 are secured on both sides thereof. The side rails 36 may be secured by welding, threaded fasteners, and other suitable fastening methods known to those skilled in the art of trailer manufacture.

Figure 4A:
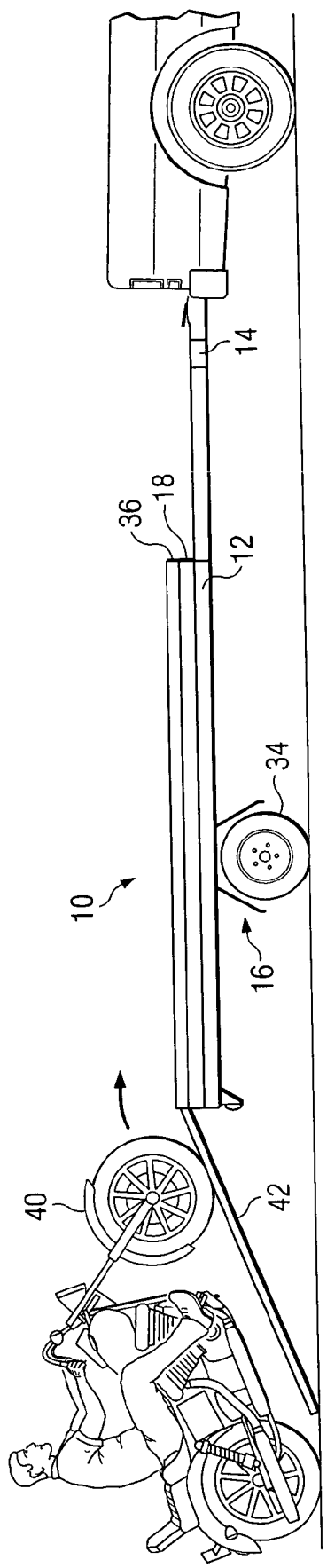
FIG. 4A is an environmental view illustrating an initial step in the utilization of the transport trailer shown in FIG. 1.
Figure 4B:
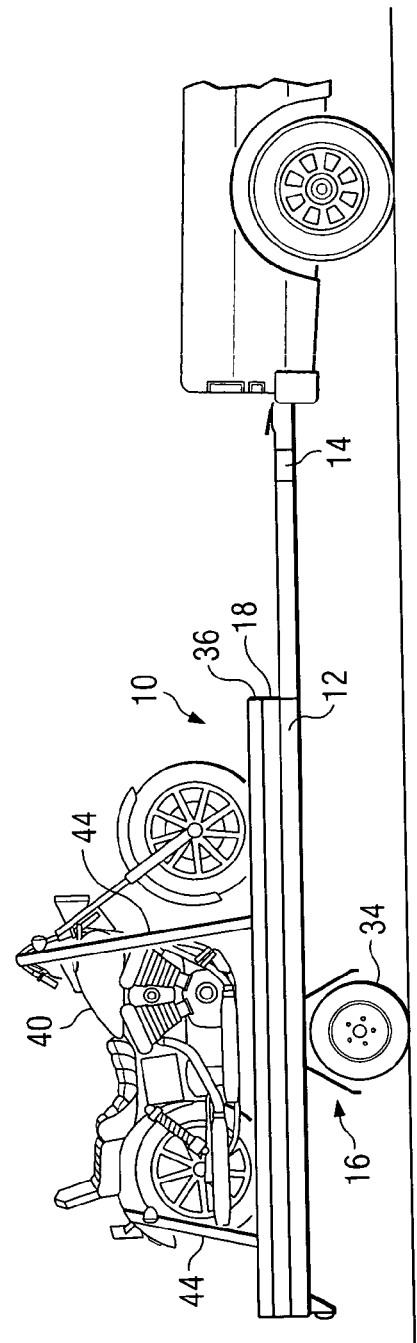
FIG. 4B is an environmental view illustrating a later step in the utilization of the transport trailer shown in FIG. 1.

FIGS. 4A through 4D illustrate steps in the utilization of the transport trailer 10. As best shown in FIG. 4A, a motorcycle or other vehicle 40 is loaded onto the trailer 10 by upward movement along a ramp 42 and onto the rear of the transport trailer 10. Once the vehicle 40 is loaded onto the transport trailer 10 it is secured to the support surface 18 by straps 44 for transportation on the trailer 10 as shown in FIG. 4B. Other fastening devices such as brackets, chains, or the like may be used to secure items on the support surface 18. As shown in FIG. 4C, in preparation for unloading, the locking pins 22 are removed from the front apertures 24 and the support surface 18 is rotated 180° into a reverse orientation. If the trailer 10 is provided with a drive motor 74, rotation of the support surface 18 is accomplished by operation thereof; otherwise the support surface 18 is rotated manually. Once the support surface 18 is in the reverse orientation the locking pins 22 are inserted into the rear apertures 26 and the vehicle 40 is unloaded down the ramp 42 in a forward orientation.

FIG. 5 illustrates the transport trailer 10 further comprising ramps 50 secured on each end of the support surface 18. The ramps 50 are hingedly mounted onto the support surface 18 enabling the ramps 50 to be folded downwardly for loading and unloading and folded upwardly into a perpendicular orientation relative to the support surface 18 when not in use.

FIG. 6 illustrates the transport trailer 10 further comprising storage compartments 52. The storage compartments 52 are secured to the frame of the wheel assembly 16. The storage compartments 52 may be secured to the frame 12 by welding, threaded fasteners, and other suitable fastening methods known to those skilled in the art of manufacturing transport trailers.

Figure 7:
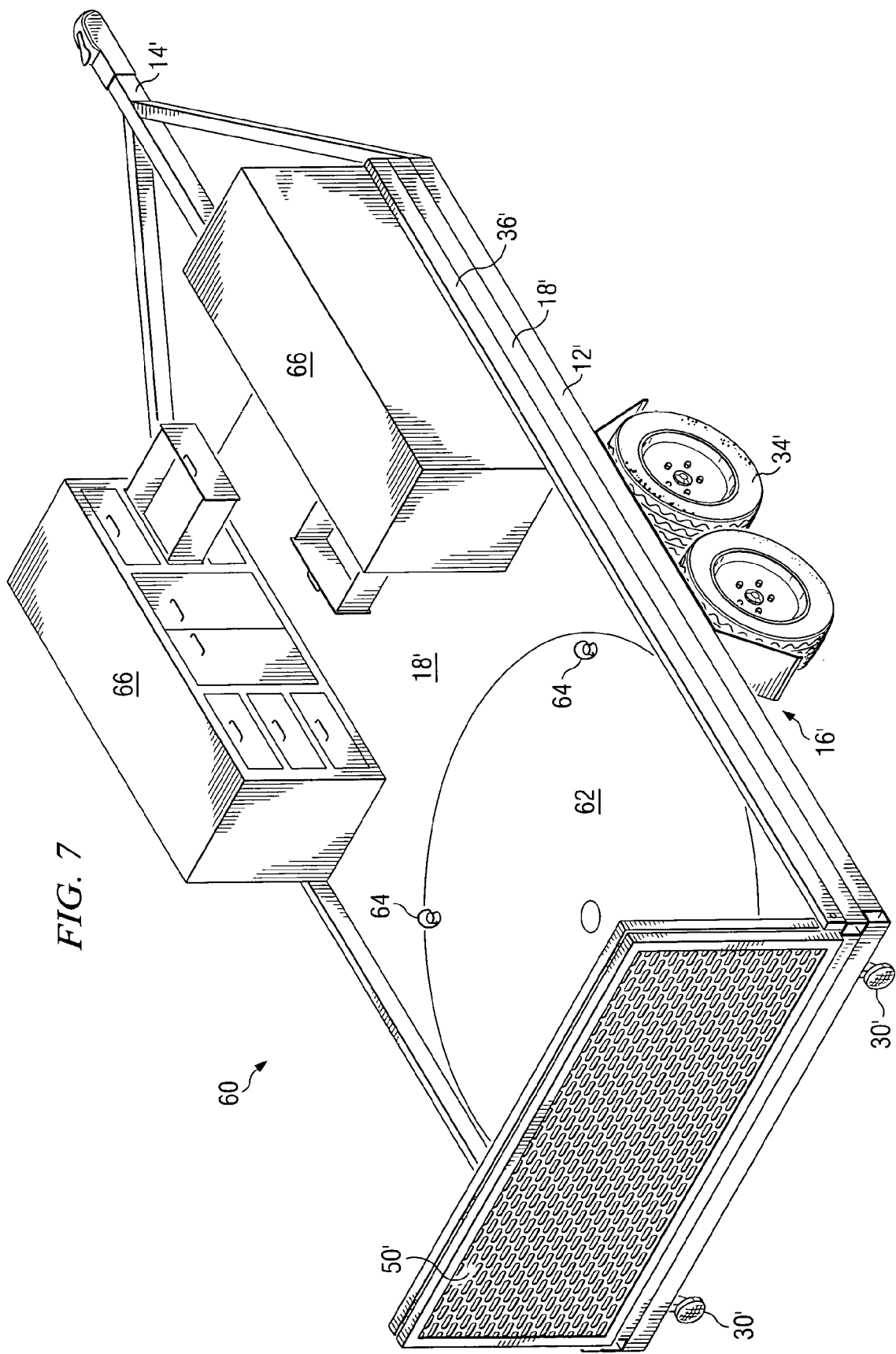
FIG. 7 is a perspective view illustrating a transport trailer comprising a second embodiment of the invention.

FIG. 7 illustrates a transport trailer 60 comprising a second embodiment of the present invention. Many of the component parts of the transport trailer 60 are substantially identical in construction and function to component parts of the transport trailer 10 illustrated in FIGS. 1 through 6 and described hereinabove in conjunction therewith. Such identical component parts are designated in FIG. 7 with the same reference numerals utilized above in the description of the transport trailer 10, but are differentiated therefrom by means of a prime (') designation.

The transport trailer 60 differs from the transport trailer 10 of FIGS. 1 through 6 in that the transport trailer 60 has a stationary support surface 18'. Instead of the entire support surface 18' rotating from a forward to a reverse orientation, the support surface 18' comprises a turntable 62 recessed therein, which revolves at least 180° and preferably 360°. The turntable 62 is secured in place by locking pins 64 which are received by a plurality of corresponding apertures in the frame 12'. The transport trailer 60 further comprises upper storage compartments 66 mounted on each side of the front of the support surface 18'.

Figure 8:
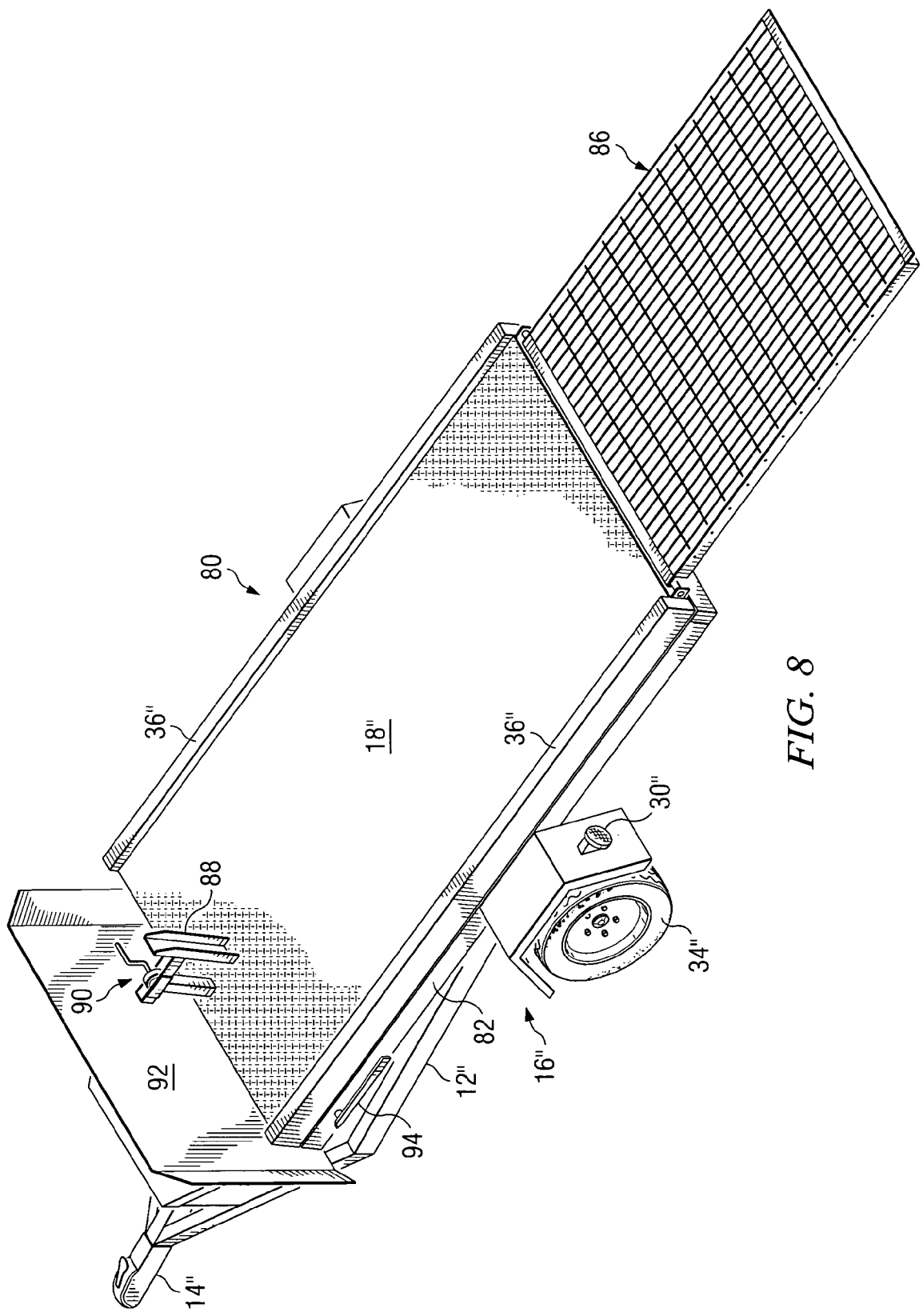
FIG. 8 is a perspective view illustrating a transport trailer comprising a third embodiment of the invention.
Figure 9:
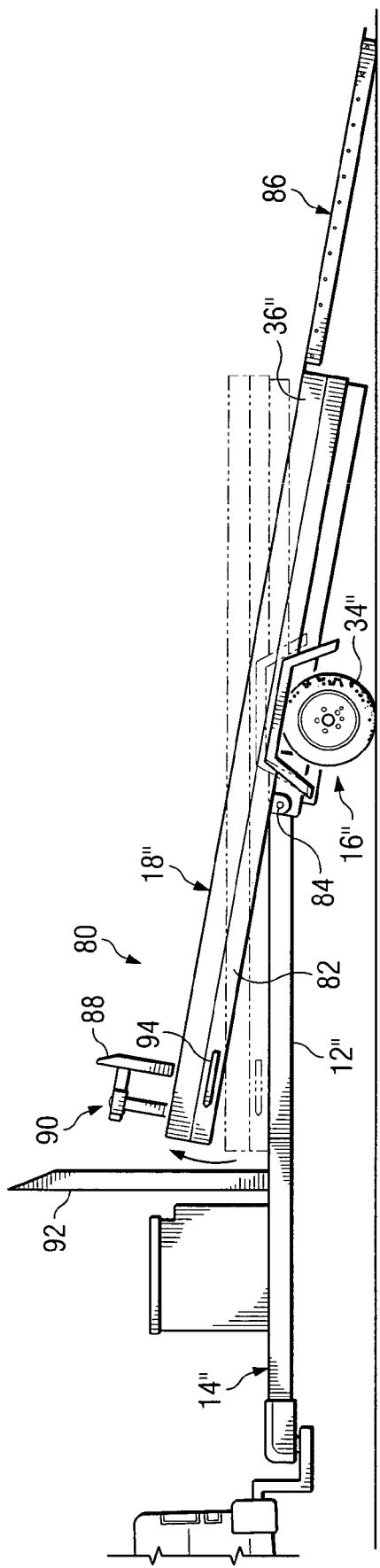
FIG. 9 is a side view of the trailer of FIG. 8 illustrating the operation thereof.
Figure 10:
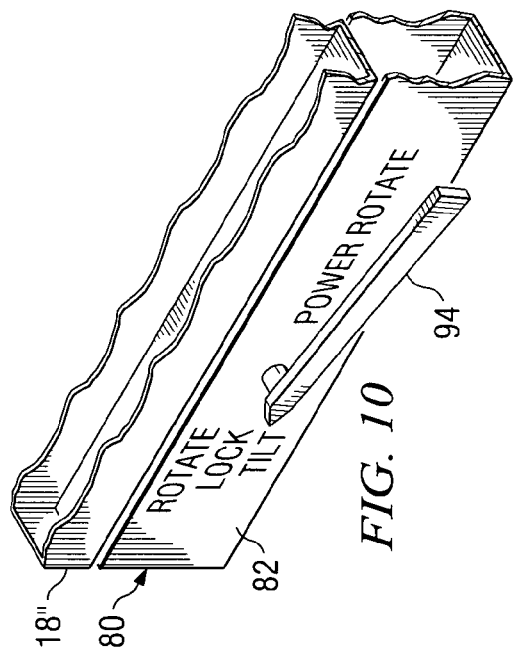
FIG. 10 is a partial perspective view illustrating the operational controls of the trailer of FIGS. 8 and 9.

FIGS. 8, 9, and 10 illustrate a transport trailer 80 comprising a third embodiment of the invention. Many of the component parts of the transport trailer 80 are substantially identical in construction and function to component parts of the transport trailer 10 illustrated in FIGS. 1-6 and described hereinabove in conjunction therewith. Such identical component parts are designated in FIGS. 8, 9, and 10 with the same reference numerals utilized above in the description of the transport trailer 10, but are differentiated therefrom by means of a double prime (") designation.

The transport trailer 80 differs from the transport trailer 10 of FIGS. 1-6 in that the support surface 18" of the transport trailer 80 is supported on a subframe 82 which is in turn supported on the frame 12". Referring particularly to FIG. 9, the subframe 82 is supported on frame 12" for pivotal movement about a horizontally disposed, transversely extending axis defined by pivot pins 84. This construction allows pivotal movement of the support surface 18" between the position illustrated in dashed lines and in full lines in FIG. 9 thereby facilitating loading and unloading of the transport trailer 80.

The transport trailer 80 is further differentiated from the transport trailer 10 of FIGS. 1-6 in that the transport trailer 80 is provided with loading/unloading ramps 86 mounted at the opposite ends of the support surface 18'. The ramps 86 are slidably supported on the structure of the support surface 18" and are manually extendable therefrom. As will be appreciated by those skilled in the art, the ramps 86 are extended to the position illustrated in FIGS. 8 and 9 to facilitate loading and unloading of the transport trailer 80. Alternatively, a single ramp 86 may be slidably extendable from the rear of the subframe 82.

The support surface 18" of the transport trailer 80 may be provided with a channel 88. If used, the channel 88 receives the front wheel of a motorcycle or similar vehicle during transport thereof on the transport trailer 80. A winch 90 may be employed to secure such a vehicle on the support surface 18" of the transport trailer 80 with the front wheel thereof firmly engaged with the channel 88. A stone guard 92 is positioned at the front of the frame 12" to prevent damage to articles transported on the trailer 80 from flying debris.

Referring to FIG. 10, the transport trailer 80 is operated utilizing an operating lever 94 which is pivotally mounted on one side of the subframe 82. The operating lever 94 is selectively positional between "ROTATE", "LOCK", "TILT", and "POWER ROTATE" positions. Positioning the operating lever 94 in the "ROTATE" position allows the support surface 18" of the transport trailer 80 to be manually rotated about a vertical axis aligned with the horizontal axes of the wheels 34". Positioning the operating lever 94 in the "LOCK" position secures the support surface 18' of the transport trailer 80 against either rotational or tilting movement. Positioning the operating lever 94 in the "TILT" position allows the support surface 18" of the transport trailer 80 to be tilted between the positions shown in dashed lines and in full lines in FIG. 9. Positioning the operating lever 94 in the "POWER ROTATE" position causes the support surface 18" of the transport trailer 80 to rotate relative to the frame 12" thereof under the action of a drive motor similar to the drive motor 74 illustrated in FIG. 2 and described hereinabove in conjunction therewith.

Figure 11:
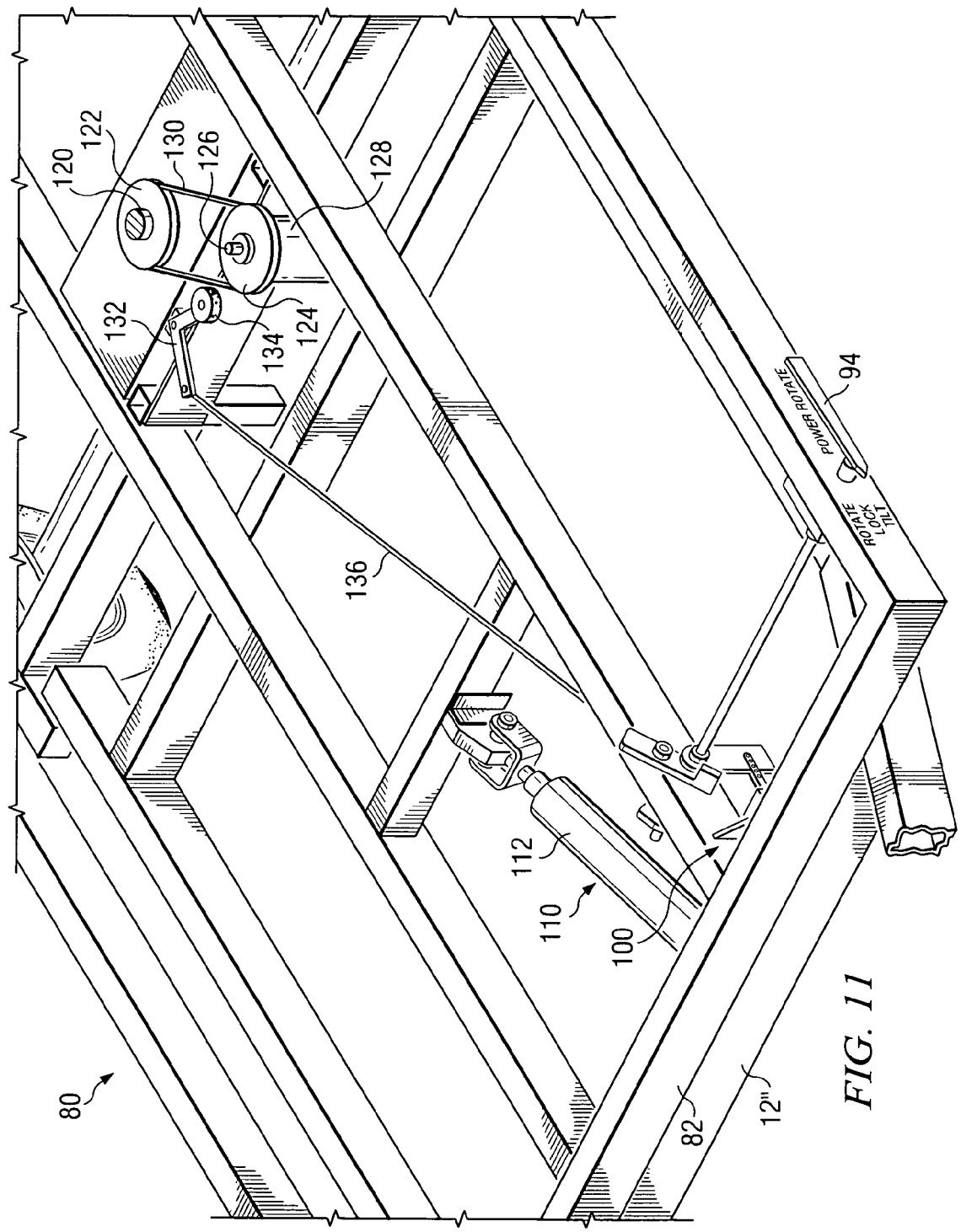
FIG. 11 is a partial perspective view illustrating the power rotate mechanism of the trailer of FIGS. 8 and 9.
Figure 12:
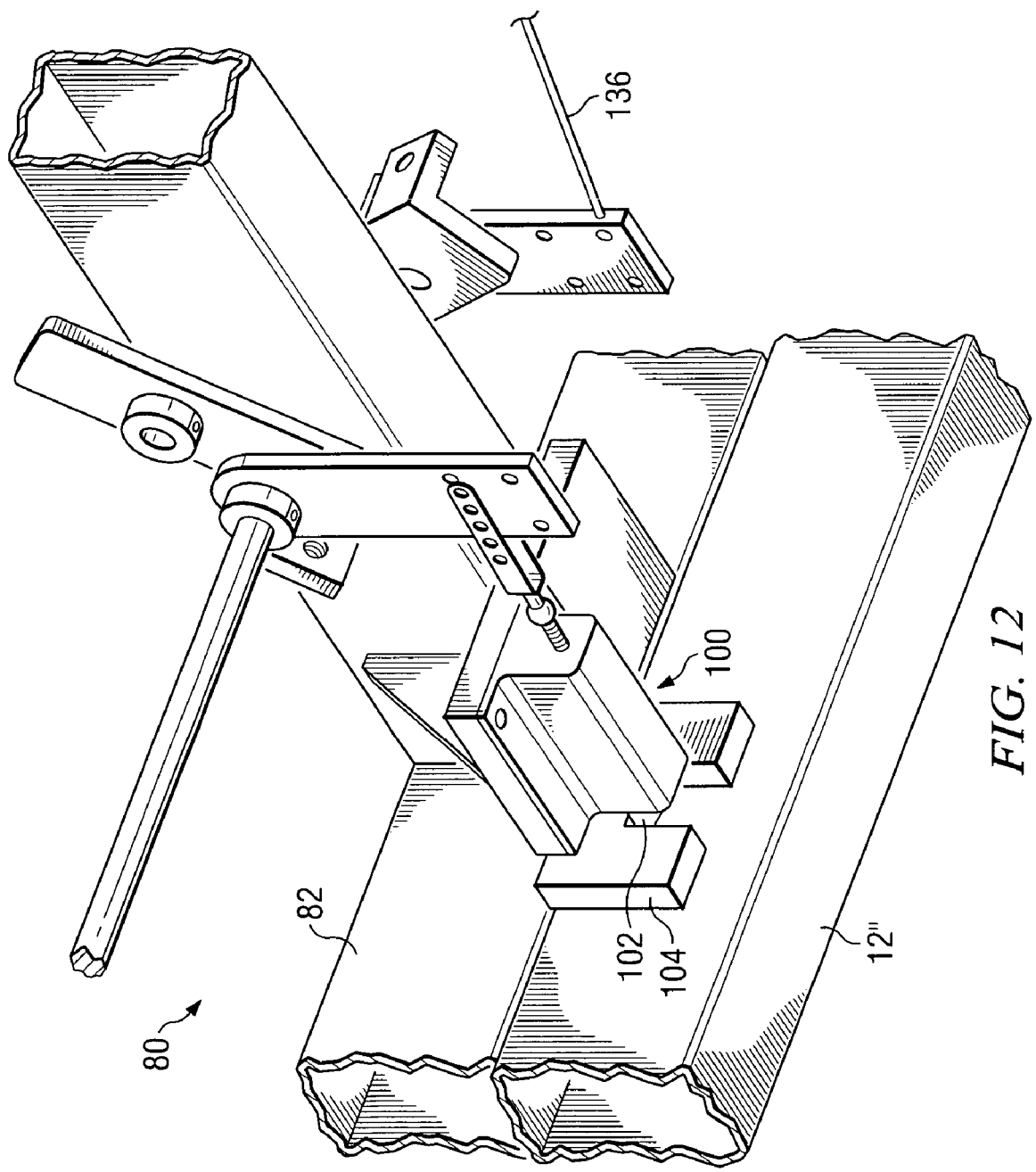
FIG. 12 is a partial perspective view illustrating a latching mechanism utilized in the trailer of FIGS. 8 and 9.
Figure 13:
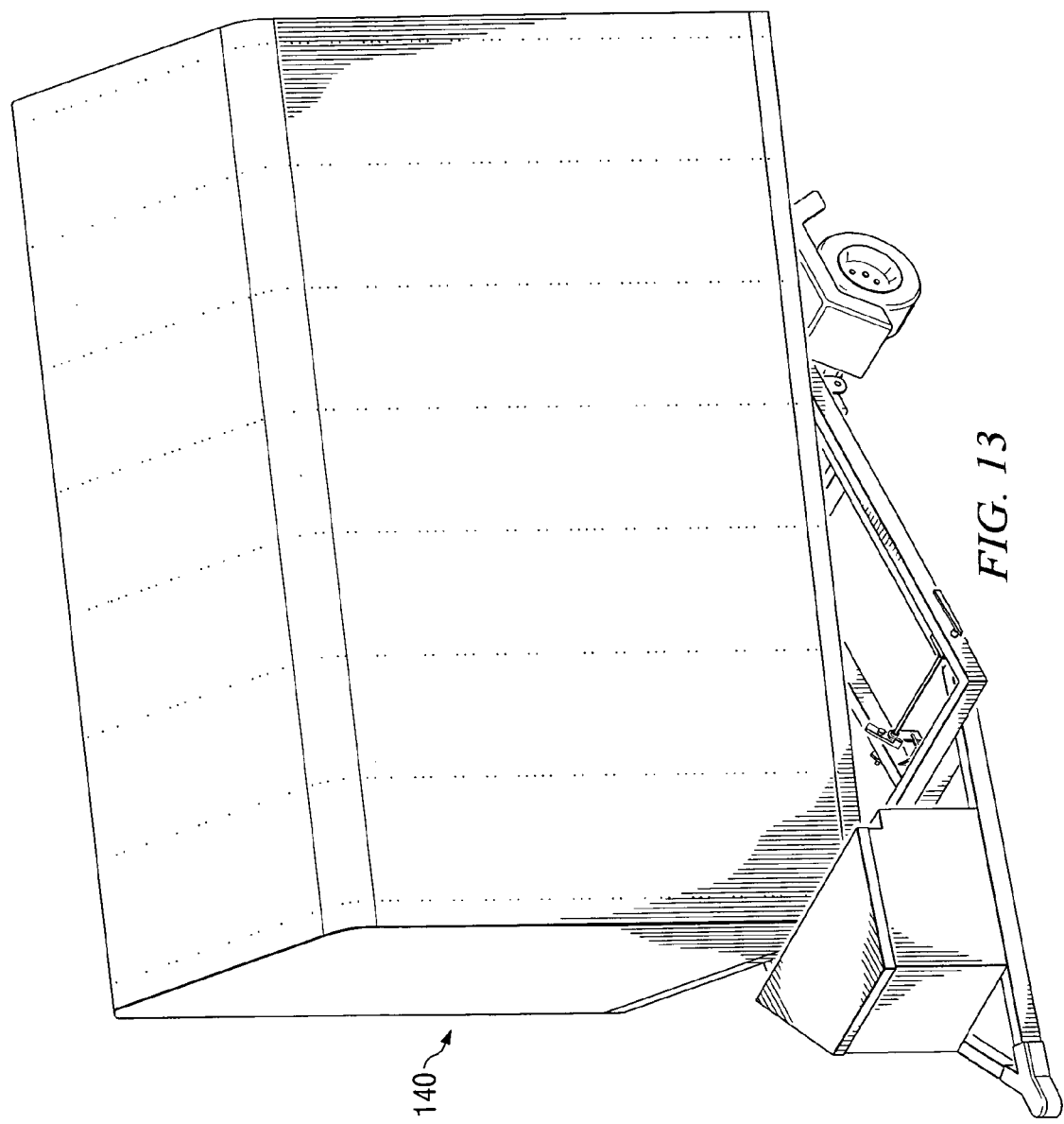
FIG. 13 is a perspective view illustrating a housing useful in conjunction wit all embodiments of the invention.

Referring to FIGS. 11, 12, and 13, the transport trailer 80 is provided with a latch mechanism 100 which normally prevents the subframe 82 from pivoting relative to the frame 12".

The latch mechanism 100 functions similarly to the latch mechanism of a conventional interior or exterior door. Thus, the latch mechanism 100 includes a latching member 102 (FIG. 12) having a camming surface on one side and a latching surface on the opposite side. When the subframe 82 is positioned as shown in dashed lines in FIG. 9, the latching surface of the latching member 102 engages a retaining surface of a retainer 104 secured to the frame 12" thereby preventing the subframe 82 from tilting relative to the frame 12'. However, when the lever 94 is moved to the "TILT" position as shown in FIG. 10, the latching member 102 of the latch 100 is withdrawn thereby permitting the subframe 82 to pivot upwardly relative to the frame 12" into the position in full lines in FIG. 9.

Referring particularly to FIG. 11, a damping mechanism 110 is connected between the frame 12" and the subframe 82 to control the speed at which the subframe 82 tilts relative to the frame 12". The damping mechanism 110 comprises a cylinder 112 having a piston mounted therein. Hydraulic fluid is provided on opposite sides of the piston. Suitable conduits connect the opposite ends of the cylinder 112 to a flow limiting device. Thus, the speed at which the piston moves within the cylinder 112 and therefore the speed at which the subframe 82 pivots relative to the frame 12" depends upon the rate of flow of hydraulic fluid between the opposite ends of the cylinder 112 which is regulated by the flow limiting device.

Still referring to FIG. 11, the support surface 18" of the transport trailer 80 is supported for rotation about a nominally vertically disposed axis by a shaft 120. The shaft 120 is supported on the subframe 82 similarly to the support of the shaft 20 of the transport trailer 10 as illustrated in FIG. 2 and described hereinabove in connection therewith.

A pulley 122 is secured to the shaft 120 and a pulley 124 is secured to the output shaft 126 of a drive motor 128. A belt 130 is operatively connected between the pulley 122 and the pulley 124 but is normally in a loose or non-operative condition such that even if the motor 128 is operating, the shaft 120 and the support surface 18" connected thereto are not rotated by the motor 128.

An actuating lever 132 is pivotally supported on the subframe 82. The actuating lever 132 is provided with an actuating roller 134 which is normally disengaged from the belt 130. When the lever 94 is positioned in the "POWER ROTATE" position, a line 136 operatively connected to the lever 94 pivots the actuating lever 132 toward the belt 130 thereby bringing the actuating roller 134 into engagement with the belt 130. This action increases the tension in the belt 130 sufficiently to form a drive connection between the pulley 124 which is operatively connected to the output shaft 126 of the motor 128 and the pulley 122 which is operatively connected to the shaft 120. Thus, whenever the lever 94 is positioned in the "POWER ROTATE" position, the support surface 18" is pivoted under the action of the motor 128.

Referring to FIG. 13, any of the trailer configurations illustrated in FIGS. 1-12, inclusive and described hereinabove in connection therewith may be provided with a housing 140. The function of the housing 140 is to protect items transported by the trailer, particularly motorcycles and other powered vehicles, from the elements. The housing 140 may be constructed from a wide variety of materials conventionally used in the construction of covering for trucks and trailers including but not limited to canvas and other fabrics, fiberglass and other polymeric materials, plywood and other wood products, aluminum and other metals, etc.

The present invention has been illustrated in conjunction with the transport of a motorcycle, but the transport trailer of the present invention may be used in the transport of various vehicles and other items commonly transported on a trailer.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A transport trailer comprising:
a frame positioned in a first nominally horizontal plane and having a front end and a rear end;
a wheel assembly secured to the frame;
the wheel assembly comprising an axle and at least two wheels supported for rotation relative to the axle about a nominally horizontally extending axis;
the frame supporting the axle in a second horizontal plane located below the first horizontal plane;
first and second bearings;
the first bearing supported by the frame at a vertical location below the first horizontal plane;
the second bearing supported by the frame at a vertical location substantially aligned with the second horizontal plane;
a shaft supported by the first and second bearings for rotation about a nominally vertically extending axis rearward of the nominally horizontally extending axis of the wheel assembly;
a support surface having a forward end and a rearward end;
the shaft supporting the support surface for rotation relative to the frame through an arc of at least 180°;
the first and second bearings comprising the sole means for supporting the support surface on the frame;
means for normally securing the support surface against rotation relative to the frame with the forward end of the support surface aligned with the front end of the frame;
means for alternatively securing the support surface against rotation relative to the frame with the forward end of the support surface aligned with the rear end of the frame;
ramp means selectively positionable adjacent the rear end of the frame for facilitating the movement of articles onto the support surface when the forward end of the support surface is secured to the front end of the frame and for facilitating the movement of articles off of the support surface when the forward end of the support surface is secured to the rear end of the frame; and
hitch means secured to the frame and extending forwardly therefrom.

2. The transport trailer according to claim 1 further comprising a subframe and means for tilting the subframe and the support surface about the nominally horizontal axis defined by the axle.

* * * * *